(12) United States Patent
Yokoyama et al.

(10) Patent No.: US 10,593,994 B2
(45) Date of Patent: Mar. 17, 2020

(54) QUASI-SOLID STATE ELECTROLYTE AND ALL SOLID STATE LITHIUM SECONDARY BATTERY USING SAME

(71) Applicants: HITACHI, LTD., Tokyo (JP); TOHOKU UNIVERSITY, Sendai-shi, Miyagi (JP)

(72) Inventors: Erina Yokoyama, Tokyo (JP); Jun Kawaji, Tokyo (JP); Yoshiyuki Ganbe, Sendai (JP); Nobuto Oka, Sendai (JP); Itaru Honma, Sendai (JP)

(73) Assignees: HITACHI, LTD., Tokyo (JP); TOHOKU UNIVERSITY, Miyagi (JP)

( * ) Notice: Subject to any disclaimer, the term of this patent is extended or adjusted under 35 U.S.C. 154(b) by 190 days.

(21) Appl. No.: 15/262,072

(22) Filed: Sep. 12, 2016

(65) Prior Publication Data
US 2017/0084949 A1 Mar. 23, 2017

(30) Foreign Application Priority Data
Sep. 17, 2015 (JP) ................................ 2015-184010

(51) Int. Cl.
H01M 10/0565 (2010.01)
H01M 10/056 (2010.01)
H01M 10/052 (2010.01)
H01M 10/0525 (2010.01)

(52) U.S. Cl.
CPC ....... H01M 10/056 (2013.01); H01M 10/052 (2013.01); H01M 10/0525 (2013.01); H01M 10/0565 (2013.01); H01M 2300/0085 (2013.01)

(58) Field of Classification Search
CPC ......... H01M 10/0565; H01M 10/0525; H01M 10/052; H01M 10/056; H01M 2300/0085
See application file for complete search history.

(56) References Cited

U.S. PATENT DOCUMENTS

| 8,778,542 B2 | 7/2014 | Iwaya et al. | |
| 9,017,864 B2 | 4/2015 | Kimura et al. | |
| 2004/0002002 A1* | 1/2004 | Mizuta | H01G 9/035 429/188 |

(Continued)

FOREIGN PATENT DOCUMENTS

| JP | 2003-157719 A | 5/2003 |
| JP | 2010225511 A2 | 10/2010 |

(Continued)

OTHER PUBLICATIONS

JP 2011119053 (Year: 2011).*

(Continued)

Primary Examiner — Alexander Usyatinsky
(74) Attorney, Agent, or Firm — Volpe and Koenig, P.C.

(57) ABSTRACT

It is an objective of the invention to provide a quasi-solid state electrolyte that has a well-balanced combination of contact performance with electrode active materials, conductivity, and chemical and structural stability, each at a high level, and an all solid state lithium secondary battery using the quasi-solid state electrolyte. There is provided a quasi-solid state electrolyte comprising: metal oxide particles; and an ionic conductor, the ionic conductor being a mixture of either a glyme or DEME-TFSI and a lithium salt that includes LiFSI, and being carried by the metal oxide particles.

10 Claims, 2 Drawing Sheets

(56) References Cited

U.S. PATENT DOCUMENTS

| | | | | |
|---|---|---|---|---|
| 2008/0138704 A1* | 6/2008 | Mizuta | ................... | H01G 9/035 |
| | | | | 429/203 |
| 2011/0195315 A1 | 8/2011 | Tsuchida et al. | | |
| 2012/0258357 A1 | 10/2012 | Kim | | |
| 2014/0017577 A1* | 1/2014 | Minami | .............. | H01M 4/9016 |
| | | | | 429/405 |
| 2014/0377621 A1 | 12/2014 | Hanyu et al. | | |
| 2016/0156067 A1 | 6/2016 | Suzuki et al. | | |

FOREIGN PATENT DOCUMENTS

| | | | |
|---|---|---|---|
| JP | 2011119053 | A2 | 6/2011 |
| JP | 2011-165467 | A | 8/2011 |
| JP | 2012-199003 | A | 10/2012 |
| JP | 2013-197061 | A | 9/2013 |
| JP | 2015-065053 | A | 4/2015 |
| KR | 20110106342 | A | 9/2011 |
| KR | 20120115839 | A | 10/2012 |
| WO | 2013/051308 | A1 | 4/2013 |
| WO | 2015/008496 | A1 | 1/2015 |

OTHER PUBLICATIONS

The Korean Office Action dated Dec. 19, 2017 for the Korean Application No. 10-2016-0109922.
Japanese Office Action dated Mar. 19, 2019 for the Japanese Patent Application No. 2015-184010.
Yamada et al., "A superconcentrated ether electrolyte for fast-charging Li-ion batteries," Chem. Commun., 49, 11194-11196 (2013).

* cited by examiner

QUASI-SOLID STATE ELECTROLYTE AND ALL SOLID STATE LITHIUM SECONDARY BATTERY USING SAME

CLAIM OF PRIORITY

The present application claims priority from Japanese patent application serial no. 2015-184010 filed on Sep. 17, 2015, the content of which is hereby incorporated by reference into this application.

1. FIELD OF THE INVENTION

The present invention relates to all solid state secondary batteries, and more specifically to a quasi-solid state electrolyte that conducts lithium ions and an all solid state lithium secondary battery using the quasi-solid state electrolyte.

2. DESCRIPTION OF RELATED ART

Lithium secondary batteries have higher energy densities than those of other secondary batteries, which is an advantage in reducing the size and weight of secondary batteries without sacrificing electrical capacitance (i.e., achieving a larger capacitance and a higher output with the same battery capacity). Therefore, lithium secondary batteries find a wide range of applications in small electrical devices (such as portable personal computers, mobile phones, and wearable devices) as their power sources, for example.

Since the upper temperature limit of a typical non-aqueous electrolyte is around 60° C., and the solvent that constitutes a non-aqueous electrolyte is flammable, lithium secondary batteries using non-aqueous electrolytes have a disadvantage in terms of heat resistance and fire resistance. Meanwhile, all solid state lithium secondary batteries using solid state electrolytes having higher heat resistances and fire resistances than those of non-aqueous electrolytes (e.g., polymer electrolytes and inorganic electrolytes) are currently under vigorous research and development.

All solid state lithium secondary batteries are largely categorized into two types: thin film type and bulk type. In terms of capacitance, bulk-type batteries have an advantage because the absolute amount of the electrode active materials they can contain is larger. In other words, bulk-type batteries have plenty of capacitance and therefore have less constraints of electrical device sizes (i.e., the amount of power consumption), which allows them to find a wider range of applications.

Unfortunately, however, in bulk-type all solid state lithium secondary batteries, the contact (the secured contact area) between the solid state electrolyte, which serves as a lithium ion conduction path, and each electrode active material is often insufficient, and the contact resistance is often too large (i.e., the lithium ion conduction is inhibited) as the solid state electrolyte has no fluidity, unlike non-aqueous electrolytes. In particular, when oxide particles are used as the solid state electrolyte, gaps are often left between the solid state electrolyte particles and each electrode active material, increasing the contact resistance. In some cases, a high resistant layer was formed at the interface between the solid state electrolyte and each electrode active material.

As a solution to the problems described above, Japanese Patent Laid-open No. 2011-165467 (JP 2011-165467 A), for example, discloses a solid state battery including a positive electrode active material layer that includes a positive electrode active material, a negative electrode active material layer that includes a negative electrode active material, and a solid state electrolyte layer that is formed between the positive electrode active material layer and the negative electrode active material layer, the solid state battery being characterized in that a reaction suppressing portion made of an oxide of a group-4 metallic element is formed at the interface between the positive electrode active material layer and an amorphous non-bridging sulfide-based solid state electrolyte material that does not substantially contain bridging sulfur.

Also, Japanese Patent Laid-open No. 2003-157719 (JP 2003-157719 A) discloses an ambient-temperature molten salt type solid state electrolyte composed of an ambient-temperature molten salt, an insulating ceramic filler (at least one kind out of nano size $TiO_2$, $SiO_2$, $Al_2O_3$, and $BaTiO_3$), and a polymer (at least one kind out of polyethylene oxide, polyacrylonitrile, polyvinylidene fluoride, and polymethyl methacrylate), and another ambient-temperature molten salt type solid state electrolyte composed of these three components and a lithium salt.

According to JP 2011-165467 A, there can be provided a solid state battery whose sulfide-based solid state electrolyte material exhibits less degradation and whose reaction suppressing portion formed between the positive electrode active material and the sulfide-based solid electrolyte material prevents electrode fractures. Also, according to JP 2003-157719 A, there can be provided an ambient-temperature molten salt solid state electrolyte that is high in ionic conductivity, superior in thermal stability, safe because of its non-flammability, and capable of forming a sturdy membrane.

Unfortunately, however, when sulfide-based solid state electrolytes such as the one disclosed in JP 2011-165467 A come in contact with the atmosphere, they may chemically react with moisture in the atmosphere to produce hydrogen sulfide. Since secondary batteries are consumer products, the production of such a substance would be undesirable.

On the other hand, polymer electrolytes, because of their relatively low oxidation resistance, have the disadvantage of easily oxidizing and decomposing when they are brought into direct contact with an electrode active material at high temperature, although they are generally expected to operate at a high temperature (e.g., around 80° C.) in order to secure a sufficient conductivity. In addition, charges/discharges at a high rate for a higher output of a secondary battery accelerate the process of oxidization and decomposition of the polymer electrolytes.

Therefore, for all solid state secondary batteries with higher performance, there is a strong need for a solid state electrolyte that is chemically and structurally more stable than before while being capable of securing a good contact with electrode active materials and having a high conductivity.

SUMMARY OF THE INVENTION

In view of the foregoing, it is an objective of the present invention to provide a quasi-solid state electrolyte that has a well-balanced combination of contact performance with electrode active materials, conductivity, and chemical and structural stability, each at a high level. And another objective of the invention is to provide an all solid state lithium secondary battery using the quasi-solid state electrolyte for allowing a higher output (charging/discharging at a higher rate) than conventional bulk-type all solid state lithium secondary batteries.

(I) According to one aspect of the present invention, there is provided a quasi-solid state electrolyte including metal oxide particles and an ionic conductor. The ionic conductor is a mixture of one of a glyme and N,N-diethyl-N-methyl-N-(2-methoxyethyl)ammonium bis(trifluoromethylsulfonyl)imide (DEME-TFSI) and a lithium salt including lithium bis(fluorosulfonyl)imide (LiFSI), and is carried by the metal oxide particles.

(II) According to another aspect of the present invention, there is provided an all solid state lithium secondary battery including a positive electrode layer, an electrolyte layer, and a negative electrode layer that are laminated together. The electrolyte layer is formed of the quasi-solid state electrolyte according to the embodiment described above, and at least one of the positive electrode layer and the negative electrode layer is impregnated with the quasi-solid state electrolyte.

In the above quasi-solid state electrolyte (I) and the above all solid state lithium secondary battery (II), the following modifications and changes can be made.

(i) The glyme is a tetraglyme.
(ii) The metal oxide particles are silica particles.
(iii) The metal oxide particles are γ-alumina particles.
(iv) The metal oxide particles are ceria particles or zirconia particles.
(v) The quasi-solid state electrolyte further comprises a binder, the binder being polytetrafluoroethylene.

Advantages of the Invention

According to the present invention, it is possible to provide a quasi-solid state electrolyte with a well-balanced combination of contact performance with electrode active materials, conductivity, and chemical and structural stability, each at a high level. Also, by using the quasi-solid state electrolyte, it is possible to provide a bulk-type all solid state lithium secondary battery that is high in chemical stability (and thus high in safety and reliability) and allows a high output (charging/discharging at a high rate).

DETAILED DESCRIPTION OF THE PREFERRED EMBODIMENTS

Figure 1:
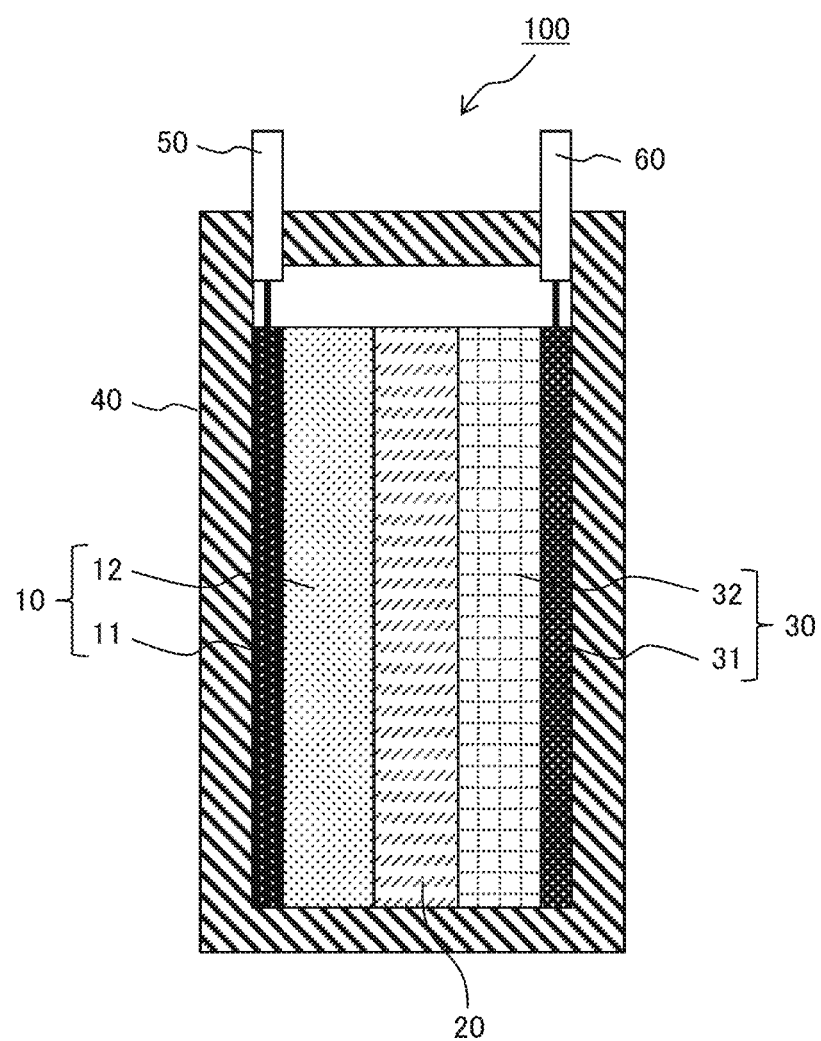
FIG. 1 is a schematic illustration showing a cross-sectional view of an all solid state lithium secondary battery according to an embodiment of the invention.

Preferred embodiments of the present invention will be described hereinafter in more detail with reference to the accompanying drawings. However, the invention is not limited to the specific embodiments described below, but various combinations and modifications are possible without departing from the technical idea of the invention, where appropriate. Also, like reference numerals represent like members and portions throughout the drawings, and duplicated descriptions will be omitted to avoid repetition.

While descriptions in this specification will be given with a lithium ion secondary battery as an exemplary all solid state secondary battery, the technical idea of the invention can just as easily be applied to sodium ion secondary batteries, magnesium ion secondary batteries, and aluminum ion secondary batteries as well.

FIG. 1 is a schematic illustration showing a cross-sectional view of an all solid state lithium secondary battery according to an embodiment of the invention. In FIG. 1, a single unit cell structure is shown for simplicity.

As shown in FIG. 1, the all solid state lithium secondary battery 100 according to the invention has a positive electrode layer 10 and a negative electrode layer 30 that are laminated together via an electrolyte layer 20, all of which are housed in a battery case 40. The positive electrode layer 10 is composed of a positive electrode current collector 11 and a positive electrode mixture layer 12, and is electrically connected to a positive electrode 50. The negative electrode layer 30 is composed of a negative electrode current collector 31 and a negative electrode mixture layer 32, and is electrically connected to a negative electrode 60. Also, the electrolyte layer 20 of the all solid state lithium secondary battery 100 according to the invention is formed of a quasi-solid state electrolyte according to the invention, which will be described below, and at least one of the positive electrode layer 10 and the negative electrode layer 30 is impregnated with the quasi-solid state electrolyte.

While the all solid state lithium secondary battery shown in FIG. 1 has a single unit cell structure as described above, a structure with an electrode group composed of strip-shaped unit cells laminated together via the electrolyte layer 20 is preferable in terms of capacitance. In this case, since the electrolyte layer 20 has no fluidity unlike non-aqueous electrolytes, it can also serve as a separator that prevents short-circuits between the positive electrode layers 10 and the negative electrode layers 30 in the electrode group. In other words, in all solid state lithium secondary batteries, there is no need to use discrete separators that would be used in conventional lithium secondary batteries using non-aqueous electrolytes.

Meanwhile, the electrode group may be a planar array-type electrode group in which a plurality of unit cells are arrayed on an insulating substrate and connected with each other via a conductive network, instead of one composed of a plurality of unit cells laminated together. There are no particular limitations on how the unit cells are arrayed on the insulating substrate or how they are connected with each other, and any known technology may be used for the arrangement or connection. For example, the unit cells may be arrayed on a printed wiring board with a circuit formed thereon and electrically connected with each other by screen printing or any other method.

Each component of the all solid state lithium secondary battery 100 will be described hereinafter in more detail.

(Electrolyte Layer)

As described above, the electrolyte layer 20 is formed of a quasi-solid state electrolyte according to the invention. The quasi-solid state electrolyte includes metal oxide particles and an ionic conductor, and the ionic conductor is carried by the metal oxide particles. Also, the ionic conductor is a mixture of either an ionic liquid or a glyme and a lithium salt, the glyme exhibiting properties similar to those of an ionic liquid. And the ionic conductor preferably further contains a binder.

The ionic liquid employed in the invention may be any known ionic liquid that functions as an electrolyte. However, in terms of ionic conductivity (electrical conductivity), it may preferably be N,N-diethyl-N-methyl-N-(2-methoxyethyl)ammonium bis(trifluoromethylsulfonyl)imide (DEME-TFSI).

Also, the glyme (glyme: generic term for symmetric glycol diethers represented by the chemical formula of R—O(CH$_2$CH$_2$O)$_n$—R', wherein R and R' each represent a saturated hydrocarbon, and n represents an integer) may be any known glyme that exhibits properties similar to those of an ionic liquid. However, in terms of ionic conductivity (electrical conductivity), it may preferably be tetraglyme (tetraethylene dimethyl glycol, G4), triglyme (triethylene glycol dimethyl ether, G3), pentaglyme (pentaethylene glycol dimethyl ether, G5), or hexaglyme (hexaethylene glycol dimethyl ether, G6). Ionic liquids and glymes will be hereinafter collectively referred to as organic solvents.

The lithium salt may preferably be LiPF$_6$, LiBF$_4$, LiClO$_4$, LiCF$_3$SO$_3$, LiCF$_3$CO$_2$, LiAsF$_6$, LiSbF$_6$, lithium bis(oxalato)borate (LiBOB), or lithium imide salt (e.g., lithium bis(fluorosulfonyl)imide, LiFSI), for example.

The lithium imide salt to be employed is preferably high in compatibility with the glyme or ionic liquid and high in heat resistance. In particular, use of LiFSI, which is small in anion size, would increase the lithium ion conductivity in the glyme and ionic liquid fixed on the oxide nano particles (i.e., increase the conductivity of the quasi-solid state electrolyte), making it possible to obtain a lithium secondary battery with a high output. Moreover, the increased lithium ion conductivity of the quasi-solid state electrolyte would inhibit the precipitation of lithium dendrites on a negative electrode side during charges/discharges at a high rate and therefore produce desirable effects in terms of safety and battery life.

In the present invention, these lithium salts may be used either alone or in combination. Also, lithium salts other than these may be used unless they decompose at the charge/discharge potential (e.g., 2.5 to 4.5 V) of the all solid state lithium secondary battery 100 according to the invention.

The molar mixing ratio of the lithium salt to the ionic liquid or glyme (organic solvent) (organic solvent (mol)/lithium salt (mol)) is preferably 0.1 or higher and 10 or lower. A lithium salt ratio that is higher than this range would make it difficult for the lithium salt to dissolve, and a lithium salt ratio that is lower than this range would lower the output of the secondary battery as it would reduce the lithium carriers in the electrolyte, resulting in low cycle performance of the secondary battery. The molar mixing ratio is preferably 0.5 or higher and 5 or lower, and more preferably 0.8 or higher and 3 or lower.

In terms of electrochemical stability, the metal oxide particles are preferably insulating particles and insoluble in the organic solvent. For example, silica (SiO$_2$) particles, γ (gamma)-alumina (Al$_2$O$_3$) particles, and ceria (CeO$_2$) particles, and zirconia (ZrO$_2$) particles may be preferably used. Also, other known oxide electrolyte particles may be used.

Since the amount of retention of the organic solvent is considered to be in proportional to the specific surface area of the metal oxide particles, the mean particle size of the primary particles of the metal oxide particles is preferably 1 nm or larger and 10 μm or smaller. A mean particle size that is larger than this range would make the formation of the quasi-solid state electrolyte difficult as it would make the metal oxide particles incapable of retaining a sufficient amount of the organic solvent properly; and a mean particle size that is smaller than this range would also make the formation of the quasi-solid state electrolyte difficult as it would make the inter-surface force between the particles become too large and facilitate the aggregation of the particles. The mean particle size of the primary particles of the metal oxide particles is more preferably 1 nm or larger and 50 nm or smaller, and even more preferably 1 nm or larger and 10 nm or smaller. Herein, the mean particle size of particles means a mean particle size that can be measured by any known particle size distribution measuring device using the laser scattering method.

As a concrete example, use of SiO$_2$ particles (mean particle size: 7 nm, zeta potential: approximately −20 mV) as the metal oxide particles would make it possible to obtain a quasi-solid state electrolyte with a high heat resistance.

Use of γ-Al$_2$O$_3$ particles (mean particle size: 5 nm, zeta potential: approximately −5 mV) as the metal oxide particles would increase the life of the lithium secondary battery (the number of charges and discharges). While the exact reason remains unclear, it is assumed that use of highly reduction-resistant alumina particles would inhibit the precipitation of lithium dendrites on the negative electrode side during charge/discharge cycles.

Use of CeO$_2$ particles (zeta potential: approximately 30 mV) or ZrO$_2$ particles (zeta potential: approximately 40 mV) as the metal oxide particles would make it possible to obtain a quasi-solid state electrolyte with a high ionic conductivity. It is assumed that use of particles with a high zeta potential as the metal oxide particles would weaken the adsorption of the molecules of the organic solvent to the particle surfaces and thus allow freer thermal motion of the organic solvent molecules. As a result, the lithium ions would be able to move away from the organic solvent molecules more freely, facilitating the lithium ion conduction.

The mixing ratio (by volume) of the ionic conductor to the metal oxide particles is preferably 50% by volume or higher and 90% by volume or lower when the total volume of the ionic conductor and the metal oxide particles in the quasi-solid state electrolyte is 100% by volume. A volume ratio that is lower than this range would decrease the lithium ion conductivity; and a volume ratio that is higher than this range would make the shape maintenance of the quasi-solid state electrolyte difficult as it would increase the amount of the ionic conductor that is not retained on the surfaces of the metal oxide particles. The volume ratio of the ionic conductor is more preferably 60% by volume or higher and 90% by volume or lower, and even more preferably 65% by volume or higher and 85% by volume or lower.

Methods for forming the electrolyte layer 20 using the quasi-solid state electrolyte described above include compression-molding the powder of the quasi-solid state electrolyte into a pellet using a molding die or the like and adding/mixing a binder in powder form into the powder of the quasi-solid state electrolyte and forming the mixture into a sheet. For example, a highly flexible quasi-solid state electrolyte sheet can be obtained by adding and mixing a binder powder (e.g., polytetrafluoroethylene (PTFE) powder) into the powder of the quasi-solid state electrolyte.

(Positive Electrode Current Collector)

There are no particular limitations on the positive electrode current collector 11 as long as it is a low electrical resistant conductor that is heat resistant enough to withstand the heating during the process of fabricating the secondary battery and the operating temperatures of the secondary battery. Then, any positive electrode current collector similar to those in conventional lithium secondary batteries may be used. Possible candidates include metal foil (thickness: 10 μm or larger and 100 μm or smaller), perforated metal foil (thickness: 10 μm or larger and 100 μm or smaller, hole size: 0.1 mm or larger and 10 mm or smaller), expanded metal, foam metal plates, and glassy carbon plates. Also, metals such as aluminum, stainless steel, titanium, and precious metals (e.g., gold, silver and platinum) may be used.

(Negative Electrode Current Collector)

As with the positive electrode current collector 11, there are no particular limitations on the negative electrode current collector 31 as long as it is a low electrical resistant conductor that is heat resistant enough to withstand the heating during the process of fabricating the secondary battery and the operating temperatures of the secondary battery. Then, any negative electrode current collector similar to those in conventional lithium secondary batteries may be used. Possible candidates include metal foil (thickness: 10 μm or larger and 100 μm or smaller), perforated metal foil (thickness: 10 μm or larger and 100 μm or smaller, hole size: 0.1 mm or larger and 10 mm or smaller), expanded metal, foam metal plates, and glassy carbon plates. Also, metals such as copper, stainless steel, titanium, nickel, and precious metals (e.g., gold, silver and platinum) may be used.

(Battery Case)

The battery case 40 is electrically insulated at least on its inner surface, so that the electrode group housed therein is not in electrical contact with the battery case 40. The shape of the battery case 40 is usually selected according to the shape of the electrode group (e.g., rectangular cylinder, cylinder, and flat long cylinder). The material of the battery case 40 is selected from mechanically strong and corrosion resistant materials (e.g., aluminum, stainless steel, nickel-plated steel, aluminum laminated film, and engineering plastic).

(Positive Electrode Mixture Layer)

Figure 2:
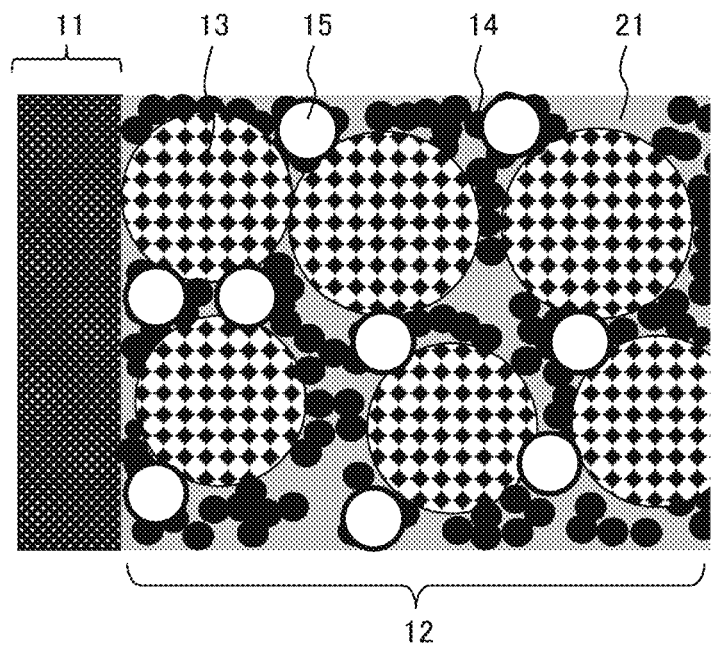
FIG. 2 is an enlarged schematic illustration showing a cross-sectional view of a positive electrode mixture layer of an all solid state lithium secondary battery according to an embodiment of the invention.

FIG. 2 is an enlarged schematic illustration showing a cross-sectional view of a positive electrode mixture layer of an all solid state lithium secondary battery according to an embodiment of the invention. As shown in FIG. 2, the positive electrode mixture layer 12 has positive electrode active material particles 13, a conductor 14 designed to improve the conductivity of the positive electrode mixture layer 12, and a binder 15 to bind these. Also, the positive electrode mixture layer 12 is preferably impregnated with a quasi-solid state electrolyte 21 in such a way that it fills the gaps in the interior of the positive electrode mixture layer 12.

According to the present invention, the impregnation and infilling of the positive electrode mixture layer 12 with the quasi-solid state electrolyte 21 facilitates the movement of lithium ions thereto and therefrom, allowing all the positive electrode active material particles 13 to directly contribute to the charges and discharges of the secondary battery. This makes it possible to improve the performance of the secondary battery.

There are no particular limitations on the material of the positive electrode active material particles 13, and any positive electrode active material for use in conventional lithium ion secondary batteries may be used. For example, lithium composite oxides containing transitional metals are preferable. Possible candidates include $LiCoO_2$, $LiNiO_2$, $LiMn_2O_4$, $LiMnO_3$, $LiMn_2O_3$, $LiMnO_2$, $Li_4Mn_5O_{12}$, $Li_2Mn_3MO_8$ (M=Fe, Co, Ni, Cu, Zn), $Li_{1-x}M_xMn_2O_4$ (M=Mg, B, Al, Fe, Co, Ni, Cr, Zn, Ca, x=0.01 to 0.1), $LiMn_{2-x}M_xO_2$ (M=Co, Ni, Fe, Cr, Zn, Ta, x=0.01 to 0.2), $LiCo_{1-x}M_xO_2$ (M=Ni, Fe, Mn, x=0.01 to 0.2), $LiNi_{1-x}M_xO_2$ (M=Mn, Fe, Co, Al, Ga, Ca, Mg, x=0.01 to 0.2), $LiNi_{1-x-y}Mn_xCo_yO_2$ (x=0.1 to 0.8, y=0.1 to 0.8, x+y=0.1 to 0.9), $LiFeO_2$, $LiFePO_4$, and $LiMnPO_4$.

The particle size of the positive electrode active material particles 13 is specified to be equal to or smaller than the thickness of the positive electrode mixture layer 12. If coarse particles with a particle size that is larger than the thickness of the positive electrode mixture layer 12 to be formed are present in the positive electrode active material powder, they are removed by sieving classification, wind flow classification or the like in advance to select particles with a particle size that is equal to or smaller than the thickness of the positive electrode mixture layer 12. The particle size of the positive electrode active material particles 13 can be measured by any known particle size distribution measuring device using the laser scattering method.

The conductor 14 may preferably be a conductive fiber (e.g., vapor-grown carbon fibers, carbon nanotubes, fibers fabricated by carbonizing pitch (a byproduct of the manufacture of petroleum, coal, coal tar or the like) at a high temperature, and carbon fibers fabricated from acrylic fibers). Also, the conductor 14 may be a material that has an electrical resistance that is lower than that of the positive electrode active material and does not oxidize or dissolve at the charge/discharge potential of the positive electrode (normally 2.5 to 4.5 V). Possible candidates include corrosion resistant metals (e.g., titanium and gold), carbides (e.g., SiC and WC), and nitrides (e.g., $Si_3N_4$ and BN). Carbon materials with a high specific surface area (e.g., carbon black and activated carbon) may be used.

The content of the quasi-solid state electrolyte 21 in the positive electrode mixture layer 12 is preferably 10% by mass or higher and 60% by mass or lower. A content of the quasi-solid state electrolyte 21 of less than 10% by mass would make the ion conduction paths too few and result in a high resistance of the positive electrode mixture layer 12. By contrast, a content of the quasi-solid state electrolyte 21 of more than 60% by mass would cause a shortage of the absolute amount of the positive electrode active material particles 13, resulting in a small energy density of the all solid state lithium secondary battery 100. The content of the quasi-solid state electrolyte 21 is more preferably 10% by mass or higher and 50% by mass or lower.

(Negative Electrode Mixture Layer)

Figure 3:
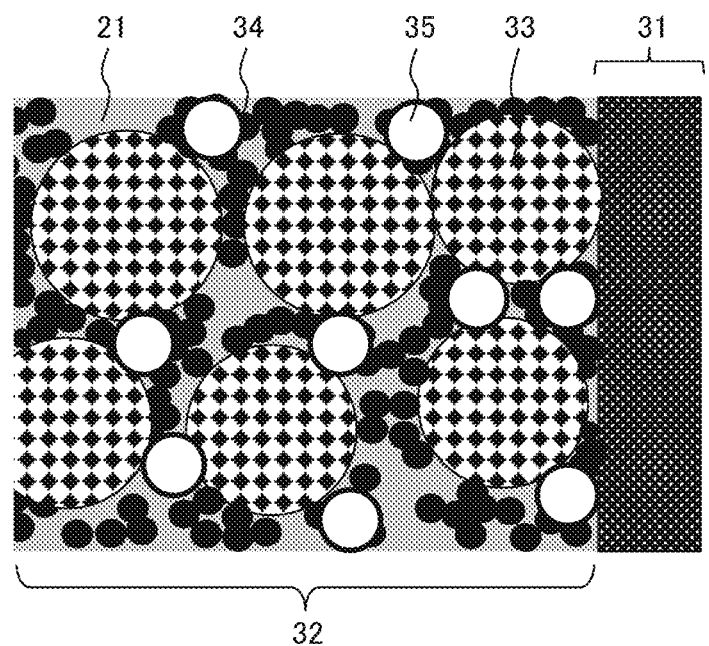
FIG. 3 is an enlarged schematic illustration showing a cross-sectional view of a negative electrode mixture layer of an all solid state lithium secondary battery according to an embodiment of the invention.

FIG. 3 is an enlarged schematic illustration showing a cross-sectional view of a negative electrode mixture layer of an all solid state lithium secondary battery according to an embodiment of the invention. As shown in FIG. 3, the negative electrode mixture layer 32 has negative electrode active material particles 33, a conductor 34 designed to improve the conductivity of the negative electrode mixture layer 32, and a binder 35 to bind these. Also, the negative electrode mixture layer 32 is preferably impregnated with a quasi-solid state electrolyte 21 in such a way that it fills the gaps in the interior of the negative electrode mixture layer 32.

According to the present invention, the impregnation of the negative electrode mixture layer 32 with the quasi-solid state electrolyte 21 facilitates the movement of lithium ions thereto and therefrom, allowing all the negative electrode active material particles 33 to directly contribute to the charges and discharges of the secondary battery. This makes it possible to improve the performance of the secondary battery.

There are no particular limitations on the material of the negative electrode active material particles 33, and any negative electrode active material for use in conventional lithium ion secondary batteries may be used. Possible candidates include carbon-based materials (e.g., graphite, easily graphitizable carbon materials, and amorphous carbon materials), conductive polymeric materials (e.g., polyacene, polyparaphenylene, polyaniline, and polyacetylene), lithium composite oxides (e.g., lithium titanate: $Li_4Ti_5O_{12}$), metallic lithium, and metals that can be alloyed with lithium (e.g., aluminum, silicon and tin).

The particle size of the negative electrode active material particles 33 is specified to be equal to or smaller than the thickness of the negative electrode mixture layer 32. If coarse particles with a particle size that is larger than the thickness of the negative electrode mixture layer 32 to be formed are present in the negative electrode active material powder, they are removed by sieving classification, wind flow classification or the like in advance to select particles with a particle size that is equal to or smaller than the thickness of the negative electrode mixture layer 32. The particle size of the negative electrode active material particles 33 can be measured similarly to the case with the positive electrode active material particles 13.

The conductor 34 and the binder 35 may be the same as the conductor 14 and the binder 15 for the positive electrode mixture layer 12, respectively.

In the case where the negative electrode active material is in particulate form, the content of the quasi-solid state electrolyte 21 in the negative electrode mixture layer 32 is preferably 10% by mass or higher and 60% by mass or lower. A content of the quasi-solid state electrolyte 21 of less than 10% by mass would make the ion conduction paths too few and result in a high resistance of the negative electrode mixture layer 32. By contrast, a content of the quasi-solid state electrolyte 21 of more than 60% by mass would cause a shortage of the absolute amount of the negative electrode active material particles 33, resulting in a small energy density of the all solid state lithium secondary battery 100. The content of the quasi-solid state electrolyte 21 is more preferably 10% by mass or higher and 50% by mass or lower.

In the case where the negative electrode active material is not in particulate form (e.g., in foil form or plate form), the conductor 34, the binder 35, and the quasi-solid state electrolyte 21 may not be used in the negative electrode mixture layer 32. Furthermore, in the case where the negative electrode active material is formed of a low electrical resistant conductor that is in foil form or plate form and equivalent to the negative electrode current collector 31, the negative electrode active material may also serve as the negative electrode current collector 31.

There are no particular limitations on the methods for fabricating the positive electrode layer 10 and the negative electrode layer 30, and any conventional method may be used appropriately. For example, the positive electrode material particles 13, the conductor 14, the binder 15, and the quasi-solid state electrolyte 21 in powder form may be mixed and pressure-molded into a pellet to form the positive electrode mixture layer 12. Then, the positive electrode mixture layer 12 may be laminated on one side or both sides of the positive electrode current collector 11 and pressure-bonded under heating to form the positive electrode layer 10. Also, the negative electrode layer 30 may be fabricated in a similar manner to the positive electrode layer 10.

In addition, based on the design concept of secondary batteries, the electrode mixture layers (the positive electrode mixture layer 12 and the negative electrode mixture layer 32) may be laminated on the electrode current collectors (the positive electrode current collector 11 and the negative electrode current collector 31) so as to cover the whole surface of each electrode current collector (the same area of each electrode current collector) or so as to leave a margin on the periphery of each electrode current collector (an area slightly smaller than each electrode current collector).

(Method for Fabricating Unit Cell and Electrode Group)

There are no particular limitations on the method for fabricating the unit cell and the electrode group, and any conventional method in the fabrication of all solid state lithium secondary batteries may be used appropriately. For example, the positive electrode layer 10, the electrolyte layer 20, and the negative electrode layer 30 may be laminated together and subjected to vacuum deaeration, heating, and pressure-bonding to form the unit cell and the electrode group. Since the all solid state lithium secondary battery group according to the invention contains the same quasi-solid state electrolyte in the electrode layers and the electrolyte layer, the process of heating and pressure-bonding improves the bondability between them.

Here, in order to prevent short-circuits between the positive electrode layer 10 and the negative electrode layer 30 because of undesired deformation of the electrolyte layer 20 caused by heating or compressive stress, a sealing structure may be applied to the margin on the periphery of each current collector. There are no particular limitations on the sealing structure or the sealing material, and any known electrical insulation sealing material/structure may be used appropriately. For example, adhesive seals and packing in which heat resistant materials such as silicone rubber, fluoro rubber, polyether ether ketone, and polytetrafluoroethylene are used, heat resistant insulating resin film, and insulating oxide film may be preferably used.

(Additional Structure of Secondary Battery)

In addition to the basic structure of a secondary battery as shown in FIG. 1, a pressure mechanism to suppress the delamination between each electrode layer and the electrolyte layer may be provided on the outside of the electrode group. There are no particular limitations on the pressure mechanism, and any known technique (e.g., the method of disposing a fixing plate on the outside of the electrode group in the direction of lamination and fixing the fixing plate with bolts or pressurizing it with springs) may be used appropriately.

Also, a heating mechanism may be provided on the outside of the electrode group. By providing a heating mechanism, it is possible to recover the bondability at the interface without deconstructing the secondary battery even if the bondability at the interface between each electrode layer and the electrolyte layer has decreased because of the volume changes of graphite- or silicone-based electrode active materials accompanying the charges and discharges of the secondary battery. There are no particular limitations on the heating mechanism, and any known technique (e.g., disposing a heating element on the outside of the electrode group) may be used appropriately.

EXAMPLES

The present invention will be described hereinafter in more detail with examples and comparative examples. However, the present invention is not limited to these examples.

Example 1

(Fabrication of Quasi-Solid State Electrolyte)

First, an ionic conductor was prepared by mixing tetraglyme (G4) and lithium bis(fluorosulfonyl)imide (LiFSI) in a molar ratio of "G4:LiFSI=1:1". Next, the ionic conductor (G4-LiFSI) and silica nano particles ($SiO_2$) were mixed in a volume ratio of "G4-LiFSI:$SiO_2$=80:20", and methanol was added thereto and mixed well for 30 minutes to prepare a quasi-solid state electrolyte slurry. Then, the slurry was spread on a petri dish and the methanol was distilled away to obtain a quasi-solid state electrolyte (QSE) powder.

(Fabrication of Electrolyte Layer)

A polytetrafluoroethylene (PTFE) powder was added to the QSE powder at 5% by mass, and the mixture was mixed well and extended into a QSE sheet. Next, the QSE sheet was stamped into a shape with a diameter of 12 mm to obtain electrolyte layers of Example 1.

(Fabrication of Positive Electrode Layer)

$LiFePO_4$ (LFP) as a positive electrode active material and acetylene black (AB) as a conductor were mixed in a mass ratio of "LFP:AB=78:22". Next, the mixture of LFP and AB (LFP-AB) and the QSE powder were mixed in a mass ratio of "LFP-AB:QSE=50:50". Then, a PTFE powder was added to the mixture of "LFP-AB+QSE" at 10% by mass, and the mixture was mixed well and extended into a positive electrode mixture sheet. Subsequently, the positive electrode mixture sheet was stamped into a shape with a diameter of 7 mm to obtain positive electrode mixture layers of Example 1. The thickness of the positive electrode mixture sheet was adjusted so that the amount of LFP in each positive electrode mixture layer would be 1.5 mg.

Then, the positive electrode mixture layers were each laminated to a metallic aluminum foil with a diameter of 7 mm and pressure-bonded to obtain positive electrode layers of Example 1.

(Fabrication of Negative Electrode Layer)

A metallic lithium foil to serve not only as a negative electrode mixture layer but also as a negative electrode current collector was used and stamped into a shape with a diameter of 10 mm to obtain negative electrode layers of Example 1.

(Fabrication of Electrode Group)

An electrode group of Example 1 was fabricated by laminating together the positive electrode layers, electrolyte layers, and negative electrode layers as prepared above and pressure-bonding them.

(Fabrication of Secondary Battery for Evaluation)

The electrode group as prepared above was sealed in a 2032 coin cell (manufactured by Hohsen Corp.) to fabricate a secondary battery for evaluation of Example 1.

(Measurement of Electrochemical Properties)

(1) Initial Capacity

The secondary battery for evaluation as prepared above was placed in a thermostat chamber (35° C.) and left for one hour or more so that its temperature was stabilized. Next, it was charged at a constant current corresponding to a 5-hour rate (0.2C rate) from an open circuit state until the battery voltage reached 4.0 V. Then, the charging was stopped. Subsequently, it was discharged at a constant current corresponding to a 5-hour rate (0.2C rate) until the battery voltage reached 2.0 V. This charge/discharge cycle was repeated five times, and the discharge capacity on the fifth cycle was taken as the initial capacity at a rate of 0.2C of the secondary battery. The QSE composition and the measurement results are shown in Table 1 below.

Herein, the hour rate of charges/discharges (C rate) represents the current value at which the designed capacity of a secondary battery is charged or discharged within a predetermined time. For example, 1-hour rate (1C rate) is the current value at which the designed capacity of a secondary battery is charged or discharged for one hour. More specifically, when the designed capacity of the battery is C (unit: Ah), the current value corresponding to a 2-hour rate (0.5C rate) is C/2 (unit: A).

(2) Potential Window

A lithium foil electrode and a gold foil electrode were arranged on one side and the other side of the QSE sheet as prepared above, respectively. With one electrode as a reference electrode and the other electrode as a working electrode, the electrochemical stability of the QSE sheet was evaluated separately on the oxidation side and the reduction side by linear sweep voltammetry. More specifically, the potential window of the QSE sheet was measured using a potentiostat. The results are also shown in Table 1.

Example 2

An experiment was conducted in the same manner as Example 1 except that the C rate during charges and discharges at which the initial capacity was measured was changed to 0.5C. The results are also shown in Table 1.

Example 3

An experiment was conducted in the same manner as Example 1 except that the C rate during charges and discharges at which the initial capacity was measured was changed to 1C. The results are also shown in Table 1.

Example 4

An experiment was conducted in the same manner as Example 1 except that the C rate during charges and discharges at which the initial capacity was measured was changed to 2C. The results are also shown in Table 1.

Example 5

An experiment was conducted in the same manner as Example 1 except that the C rate during charges and discharges at which the initial capacity was measured was changed to 5C. The results are also shown in Table 1.

Example 6

An experiment was conducted in the same manner as Example 1 except that the C rate during charges and discharges at which the initial capacity was measured was changed to 10C. The results are also shown in Table 1.

Examples 7 to 12

Experiments for Examples 7 to 12 were conducted in the same manner as Examples 1 to 6 except that the metal oxide particles in the QSE powder were changed from $SiO_2$ particles to γ-alumina nano particles (γ-$Al_2O_3$). The results are also shown in Table 1.

Examples 13 to 18

Experiments for Examples 13 to 18 were conducted in the same manner as Examples 1 to 6 except that the metal oxide particles in the QSE powder were changed from $SiO_2$ particles to ceria nano particles ($CeO_2$). The results are also shown in Table 1.

Examples 19 to 21

Experiments for Examples 19 to 21 were conducted in the same manner as Examples 1 to 3 except that the organic solvent in the QSE powder was changed from G4 of a glyme to N,N-diethyl-N-methyl-N-(2-methoxyethyl)ammonium bis(trifluoromethylsulfonyl)imide (DEME-TFSI) of an ionic liquid. The results are also shown in Table 1.

Examples 22 to 27

Experiments for Examples 22 to 27 were conducted in the same manner as Examples 1 to 6 except that the mixing ratio of the positive electrode active material (LFP) in each positive electrode layer was changed from 35% by mass to 20% by mass, and that of the AB was changed from 10% by mass to 25% by mass. The results are also shown in Table 1.

Comparative Examples 1 to 6

Experiments were conducted in the same manner as Examples 1 to 6 except that the lithium salt in the QSE powder was changed from LiFSI to lithium bis(trifluoromethanesulfonyl)imide (LiTFSI). The QSE composition and the measurement results are shown in Table 2 below.

Comparative Examples 7 to 9

Experiments were conducted in the same manner as Examples 1 to 3 except that the organic solvent in the QSE powder was changed from G4 of a glyme to N-methyl-N-propylpiperidinium bis(trifluoromethanesulfonyl)imide (PP13-TFSI) of an ionic liquid. The results are also shown in Table 2.

Comparative Example 10

An experiment was conducted in the same manner as Example 1 except that the lithium salt in the QSE powder was changed from LiFSI to LiTFSI and the organic solvent was changed from G4 to PP13-TFSI. The results are also shown in Table 2.

TABLE 1

Composition of Quasi-Solid State Electrolytes of Examples 1 to 27 and Measurement Results of Electrochemical Properties.

| | Quasi-Solid State Electrolyte | | | Electrochemical Properties | |
| --- | --- | --- | --- | --- | --- |
| | Metal | Ionic Conductor | | | Initial | Potential |
| | Oxide Particles | Organic Solvent | Lithium Salt | C Rate | Capacity (mAh·g$^{-1}$) | Window (V vs. Li/Li$^+$) |
| Example 1 | SiO$_2$ | G4 | LiFSI | 0.2 C | 156 | 0 to 4.0 |
| Example 2 | | | | 0.5 C | 152 | |
| Example 3 | | | | 1 C | 147 | |
| Example 4 | | | | 2 C | 133 | |
| Example 5 | | | | 5 C | 95 | |
| Example 6 | | | | 10 C | 62 | |
| Example 7 | Al$_2$O$_3$ | G4 | LiFSI | 0.2 C | 159 | 0 to 4.0 |
| Example 8 | | | | 0.5 C | 154 | |
| Example 9 | | | | 1 C | 149 | |
| Example 10 | | | | 2 C | 135 | |
| Example 11 | | | | 5 C | 91 | |
| Example 12 | | | | 10 C | 57 | |
| Example 13 | CeO$_2$ | G4 | LiFSI | 0.2 C | 172 | 0 to 4.0 |
| Example 14 | | | | 0.5 C | 163 | |
| Example 15 | | | | 1 C | 141 | |
| Example 16 | | | | 2 C | 96 | |
| Example 17 | | | | 5 C | 54 | |
| Example 18 | | | | 10 C | 27 | |
| Example 19 | SiO$_2$ | DEME-TFSI | LiFSI | 0.2 C | 149 | 0 to 4.0 |
| Example 20 | | | | 0.5 C | 84 | |
| Example 21 | | | | 1 C | 51 | |
| Example 22 | SiO$_2$ | G4 | LiFSI | 0.2 C | 173 | 0 to 4.0 |
| Example 23 | | | | 0.5 C | 170 | |
| Example 24 | | | | 1 C | 165 | |
| Example 25 | | | | 2 C | 156 | |
| Example 26 | | | | 5 C | 132 | |
| Example 27 | | | | 10 C | 103 | |

TABLE 2

Composition of Quasi-Solid State Electrolytes of Comparative Examples 1 to 10 and Measurement Results of Electrochemical Properties.

| | Quasi-Solid State Electrolyte | | | | Electrochemical Properties | |
| --- | --- | --- | --- | --- | --- | --- |
| | Metal | Ionic Conductor | | | | Initial | Potential |
| | Oxide Particles | Organic Solvent | Lithium Salt | C Rate | Capacity (mAh·g$^{-1}$) | Window (V vs. Li/Li$^+$) |
| Comparative Example 1 | SiO$_2$ | G4 | LiTFSI | 0.2 C | 162 | 0 to 4.0 |

TABLE 2-continued

Composition of Quasi-Solid State Electrolytes of Comparative Examples 1 to 10 and Measurement Results of Electrochemical Properties.

| | Quasi-Solid State Electrolyte | | | Electrochemical Properties | | |
|---|---|---|---|---|---|---|
| | Metal | Ionic Conductor | | | Initial | Potential |
| | Oxide Particles | Organic Solvent | Lithium Salt | C Rate | Capacity (mAh · g$^{-1}$) | Window (V vs. Li/Li$^+$) |
| Comparative Example 2 | | | | 0.5 C | 135 | |
| Comparative Example 3 | | | | 1 C | 43 | |
| Comparative Example 4 | | | | 2 C | 22 | |
| Comparative Example 5 | | | | 5 C | 10 | |
| Comparative Example 6 | | | | 10 C | 5 | |
| Comparative Example 7 | SiO$_2$ | PP13-TFSI | LiFSI | 0.2 C | 117 | 0 to 4.0 |
| Comparative Example 8 | | | | 0.5 C | 67 | |
| Comparative Example 9 | | | | 1 C | 40 | |
| Comparative Example 10 | SiO$_2$ | PP13-TFSI | LiTFSI | 0.2 C | 0.1 | 0 to 4.0 |

As shown in Tables 1 and 2, it is found that when the C rate is the same, the initial capacities of Examples 1 to 6 according to the invention are higher than those of Comparative Examples 1 to 6, where lithium salt as the ionic conductor is different from that of the invention. It is to be particularly noted that the higher the C rate is, the more significant the difference between them is. From these results, it has been confirmed that a higher output of a lithium secondary battery was achieved with Examples 1 to 6 according to the present invention.

It has been confirmed that output properties similar to those of Examples 1 to 6 can be obtained with Examples 7 to 18, each using γ-Al$_2$O$_3$ particles or CeO$_2$ particles as the metal oxide particles in the quasi-solid state electrolyte.

It is found that when the C rate is the same, the initial capacities of Examples 19 to 21, where organic solvent as an ionic conductor is DEME-TFSI of an ionic liquid are higher than those of Comparative Examples 7 to 10, where organic solvent is different from that of the invention. In other words, it can be said that a higher output of a lithium secondary battery was achieved with Examples 19 to 21 according to the present invention.

Also, it has been confirmed that even higher output properties than those of Examples 1 to 6 can be obtained with Examples 22 to 27, each containing an adjusted mixing ratio of the positive electrode active material.

As for the potential window, similar results were obtained with all of Examples 1 to 27 and Comparative Examples 1 to 10. This means that the quasi-solid state electrolyte according to the invention has electrochemical stability that is comparable to that of conventional ones. In other words, the QSE of the present invention is expected to withstand battery use for a long period.

Also, a charge/discharge cycle test (an acceleration test to evaluate the life of each lithium secondary battery) was conducted at a rate of 5C using a sample of Example 5 and a sample of Example 11. As a result, a life of about 200 cycles and a life of about 1000 cycles were obtained with the sample of Example 5 and the sample of Example 11, respectively, indicating that each has a practically sufficient battery life. For the sample of Example 11 in particular, it is assumed that such results were obtained because γ-Al$_2$O$_3$ particles were used as the metal oxide particles in the QSE for the sample, so that the precipitation of lithium dendrites was inhibited on the negative electrode side during charge/discharge cycles.

While the results of Examples 1 to 27 were all good, the output properties of Comparative Examples 1 to 10, which were out of the specifications of the present invention, were poor as compared to those of the corresponding Examples.

The invention is not limited to the above described embodiments, and various modifications can be made. Also, the above embodiments are given for the purpose of detailed illustration and explanation only, and the invention is not intended to include all features and aspects of the embodiments described above. Also, a part of an embodiment may be replaced by one or more parts of the other embodiments, or added with one or more parts of the other embodiments. Also, a part of an embodiment may be removed, or replaced by one or more parts of the other embodiments, or added with one or more parts of the other embodiments.

What is claimed is:

1. A quasi-solid state electrolyte comprising:
   metal oxide particles; and
   an ionic conductor, the ionic conductor being a mixture of an organic solvent that consists of at least one of tetraglyme, pentaglyme, hexaglyme and N,N-diethyl-N-methyl-N-(2-methoxyethyl)ammonium bis(trifluoromethylsulfonyl)imide and lithium bis(fluorosulfonyl)imide (LiFSI) and being carried by the metal oxide particles,
   wherein a molar mixing ratio of the lithium bis(trifluoromethylsulfonyl)imide to the organic solvent (organic solvent (mol)/(LiFSI) lithium salt (mol)) is 1 or higher and 10 or lower.

2. The quasi-solid state electrolyte according to claim 1, wherein the metal oxide particles are silica particles.

3. The quasi-solid state electrolyte according to claim 1, wherein the metal oxide particles are γ-alumina particles.

4. The quasi-solid state electrolyte according to claim 1, wherein the metal oxide particles are ceria particles or zirconia particles.

5. The quasi-solid state electrolyte according to claim 1, further comprising polytetrafluoroethylene.

6. An all solid state lithium secondary battery in which a positive electrode layer, an electrolyte layer, and a negative electrode layer are laminated together,
   wherein the electrolyte layer is formed of the quasi-solid state electrolyte according to claim 1, and
   wherein at least one of the positive electrode layer and the negative electrode layer is impregnated with the quasi-solid state electrolyte.

7. An all solid state lithium secondary battery in which a positive electrode layer, an electrolyte layer, and a negative electrode layer are laminated together,
   wherein the electrolyte layer is formed of the quasi-solid state electrolyte according to claim 2, and
   wherein at least one of the positive electrode layer and the negative electrode layer is impregnated with the quasi-solid state electrolyte.

8. An all solid state lithium secondary battery in which a positive electrode layer, an electrolyte layer, and a negative electrode layer are laminated together,
   wherein the electrolyte layer is formed of the quasi-solid state electrolyte according to claim 3, and
   wherein at least one of the positive electrode layer and the negative electrode layer is impregnated with the quasi-solid state electrolyte.

9. An all solid state lithium secondary battery in which a positive electrode layer, an electrolyte layer, and a negative electrode layer are laminated together,
   wherein the electrolyte layer is formed of the quasi-solid state electrolyte according to claim 4, and
   wherein at least one of the positive electrode layer and the negative electrode layer is impregnated with the quasi-solid state electrolyte.

10. An all solid state lithium secondary battery in which a positive electrode layer, an electrolyte layer, and a negative electrode layer are laminated together,
    wherein the electrolyte layer is formed of the quasi solid state electrolyte according to claim 5, and
    wherein at least one of the positive electrode layer and the negative electrode layer is impregnated with the quasi-solid state electrolyte.

\* \* \* \* \*